(12) United States Patent
Tucker et al.

(10) Patent No.: US 11,093,514 B2
(45) Date of Patent: Aug. 17, 2021

(54) RANKING OF GRAPH PATTERNS

(71) Applicant: International Business Machines Corporation, Armonk, NY (US)

(72) Inventors: Robert Tucker, Cambridge (GB); Robert Kerr, Cambridge (GB); Martin Nathan, Chelmsford (GB); Dominique Martindale, Cambridgeshire (GB)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 16/042,067

(22) Filed: Jul. 23, 2018

(65) Prior Publication Data

US 2020/0026771 A1 Jan. 23, 2020

(51) Int. Cl.
*G06F 16/00* (2019.01)
*G06F 16/2457* (2019.01)
*G06F 16/901* (2019.01)

(52) U.S. Cl.
CPC .... *G06F 16/24578* (2019.01); *G06F 16/9024* (2019.01)

(58) Field of Classification Search
None
See application file for complete search history.

(56) References Cited

U.S. PATENT DOCUMENTS

| | | | |
|---|---|---|---|
| 2002/0111941 A1* | 8/2002 | Roux | G06F 16/3344 |
| 2004/0002973 A1 | 1/2004 | Chaudhuri et al. | |
| 2012/0047124 A1* | 2/2012 | Duan | G06F 16/24534 |
| | | | 707/714 |
| 2013/0226846 A1 | 8/2013 | Li et al. | |
| 2014/0059043 A1* | 2/2014 | Sundara | G06F 16/00 |
| | | | 707/723 |
| 2014/0244687 A1 | 8/2014 | Shmueli et al. | |
| 2015/0317302 A1 | 11/2015 | Liu et al. | |
| 2016/0132572 A1* | 5/2016 | Chang | G06F 16/116 |
| | | | 707/723 |
| 2018/0260474 A1* | 9/2018 | Surdeanu | G06F 16/951 |

FOREIGN PATENT DOCUMENTS

| | | |
|---|---|---|
| CN | 103646032 A | 3/2014 |
| EP | 2731021 A1 | 5/2014 |

OTHER PUBLICATIONS

International Search Report and Written Opinion in International Application No. PCT/IB2019/056139, dated Oct. 28, 2019, 9 pages.

* cited by examiner

*Primary Examiner* — Thu Nguyet T Le
(74) *Attorney, Agent, or Firm* — Joseph Polimeni; Edell, Shapiro & Finnan, LLC (57) ABSTRACT

A query comprising a graph pattern comprising a plurality of graph triples of node-edge-node is received. A graph database comprising a plurality of graph patterns is accessed and a plurality of graph patterns in the graph database that match the received query are identified. An inverse frequency for each graph triple of the received query in the accessed graph database is calculated and from this a score for each graph pattern in the graph database that matches the received query is also calculated, the score comprising a sum of the inverse frequencies for each graph triple contained within the respective graph pattern. The plurality of graph patterns in the graph database that match the received query are then ranked according to their respective calculated scores.

15 Claims, 6 Drawing Sheets

RANKING OF GRAPH PATTERNS

BACKGROUND

The present invention relates to a method, system and computer program product for ranking graph patterns.

SUMMARY

According to a first aspect of the present invention, there is provided a computer implemented method comprising receiving a query comprising a graph pattern comprising a plurality of graph triples of node-edge-node, accessing a graph database comprising a plurality of graph patterns, identifying a plurality of graph patterns in the graph database that match the received query, calculating an inverse frequency for each graph triple of the received query in the accessed graph database, calculating a score for each graph pattern in the graph database that matches the received query, the score comprising a sum of the inverse frequencies for each graph triple contained within the respective graph pattern, and ranking the plurality of graph patterns in the graph database that match the received query according to their respective calculated scores.

According to a second aspect of the present invention, there is provided a data processing system comprising a processor arranged to receive a query comprising a graph pattern comprising a plurality of graph triples of node-edge-node, access a graph database comprising a plurality of graph patterns, identify a plurality of graph patterns in the graph database that match the received query, calculating an inverse frequency for each graph triple of the received query in the accessed graph database, calculate a score for each graph pattern in the graph database that matches the received query, the score comprising a sum of the inverse frequencies for each graph triple contained within the respective graph pattern, and rank the plurality of graph patterns in the graph database that match the received query according to their respective calculated scores.

According to a third aspect of the present invention, there is provided a computer program product for controlling a data processing system comprising a processor, the computer program product comprising a computer readable storage medium having program instructions embodied therewith, the program instructions executable by the processor to cause the processor to receive a query comprising a graph pattern comprising a plurality of graph triples of node-edge-node, access a graph database comprising a plurality of graph patterns, identify a plurality of graph patterns in the graph database that match the received query, calculate an inverse frequency for each graph triple of the received query in the accessed graph database, calculate a score for each graph pattern in the graph database that matches the received query, the score comprising a sum of the inverse frequencies for each graph triple contained within the respective graph pattern, and rank the plurality of graph patterns in the graph database that match the received query according to their respective calculated scores.

BRIEF DESCRIPTION OF THE DRAWINGS

Embodiments of the present invention will now be described, by way of example only, with reference to the following drawings, in which:—

DETAILED DESCRIPTION

Figure 1:
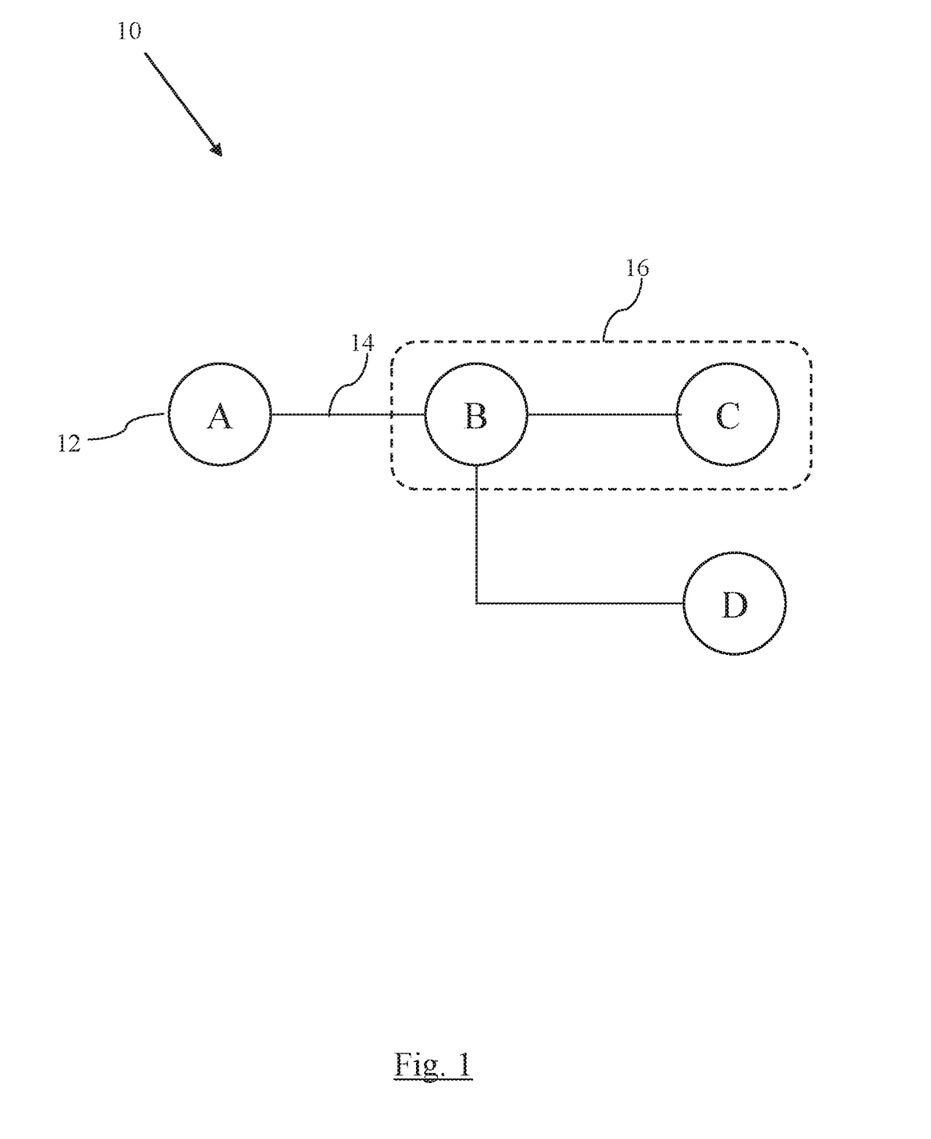
FIG. 1 is a schematic diagram of a graph pattern in accordance with an embodiment of the present invention.

FIG. 1 shows a graph pattern 10, which comprises nodes 12 and edges (connections) 14. Each edge 14 connects together two nodes 12 and can be directional, depending upon the type of data that is represented by the graph pattern 10. A graph database stores a plurality of graph patterns 10, either directly as the individual patterns 10 or as data relating to the nodes 12 and edges 14 (from which the patterns 10 are implicit). Within patterns 10 and the larger graph is the concept of a triple 16, which is made up of a node, an edge, and a node. Only one triple 16 is identified directly in FIG. 1, although the graph pattern 10 shown in FIG. 1 comprises three individual triples 16.

The graph pattern 10 shown in FIG. 1, by way of example, is made up of four nodes 12 and three connections 14. Node B represents an individual named "John Smith", node A represents their address "Mill Road, Cambridge" and nodes C and D represent two "Jaguars" owned by the individual John Smith defined by node A. The three triples 16 contained within the graph pattern 10 are "John Smith lives in Mill Road, Cambridge", "John Smith owns a Jaguar1" and "John Smith owns a Jaguar2". The graph pattern 10 is one part of a much larger multi-modal graph of information, which is stored by a graph database, which can be accessed and searched by authorised users.

In a multi-modal graph of information containing different node and edge types (for example, a graph with related People, Vehicles, Addresses), it can be challenging to discover the most relevant connections or graph patterns of interest to the user who is making a search. When the user specifies a graph pattern as a query criterion (for example, "find all people who have red cars and live in Cambridge"), there can be a large number of potential matches that require ranking to be presented to the user based on importance. Without the execution of any ranking of the graph patterns 10 that match the user's query, a very large number of results can be returned on which the user has to perform further searching.

Figure 2:
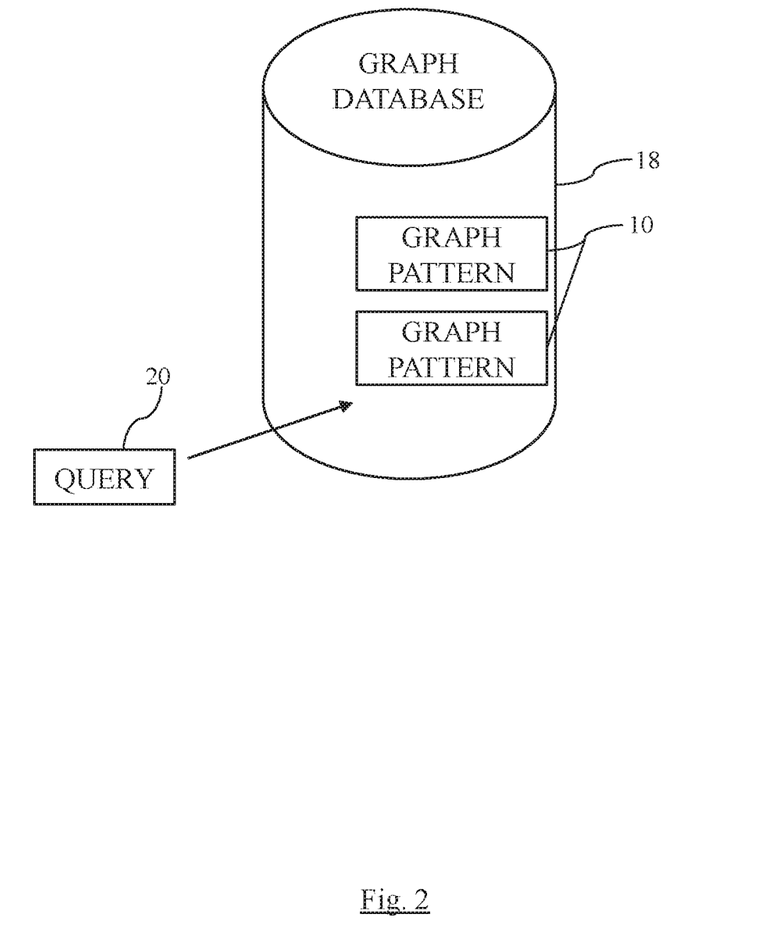
FIG. 2 is a schematic diagram of a database of graph patterns in accordance with an embodiment of the present invention.

FIG. 2 shows a graph database 18 which comprises a plurality of graph patterns 10 (whether they are stored explicitly as patterns 10 or implicitly as the data underlying the graph). A user can provide a query 20 which is received by the graph database 18. The query 20 comprises a graph pattern 10, which comprises a plurality of triples 16 of node-edge-node. The database 18 (or an appropriate interface to the database 18) provides an automated method of ranking the graph patterns 10 within the database 18 that match the query 20 that is provided by the end user. This method ranks the matched graph patterns 10 in order of importance.

The ranking of matching patterns returned from graph queries uses statistical measures of graph triples to weight their importance. The ranking measures the importance of each graph triple (for example, John Smith lives in Cambridge) within the graph query pattern 20 to aid the scoring and ranking of results, using an inverse frequency calculation. The calculation means that a graph triple 16 is more important when it exists frequently in a matching graph pattern 10 but is uncommon in the whole graph. When a user searches for a graph pattern 10, made up of graph triples 16, the importance of each matching pattern 10 can be calculated using a combination of how many times the triple 16 exists within each matching graph pattern 10 and how many instances of the triple 16 exist in the graph corpus.

This can be codified using a graph query (q), such as a person owns a red car and a person lives in Cambridge, where q contains a number of triples (t): "Person owns red car" and "Person lives in Cambridge" and where q can match any number of patterns (p) in a graph (g). To measure the importance of each matching pattern (p) the following pseudo code explains the ranking process:

For each matching pattern (p)
   For each triple (t) in the query (q)
   Calculate triple frequency (tf) in the matching pattern (p)
   Calculate inverse graph frequency (igf) of the triple (t) in the graph (g)
   Calculate the triple importance measure (tf-igf)=tf*igf
   Sum each of the tf-igf values to get the match importance measure of the match pattern.

The result of ranking process is that each of the matching patterns 10 that have been located in the graph database 18 are scored and then ranked according to their score. The output of the process will be a list of matching patterns 10 that match the query 20 that are ranked in score order. The effect of the ranking process is to promote those patterns 10 that contain within them multiple copies of the triples 16 from the query 20 that are rarest in the database 18. Each triple 16 has an inverse frequency score (meaning that the score is higher the rarer it is in the whole database 18) and the scores for each triple 16 are summed for each matching graph pattern 10.

Figure 3:
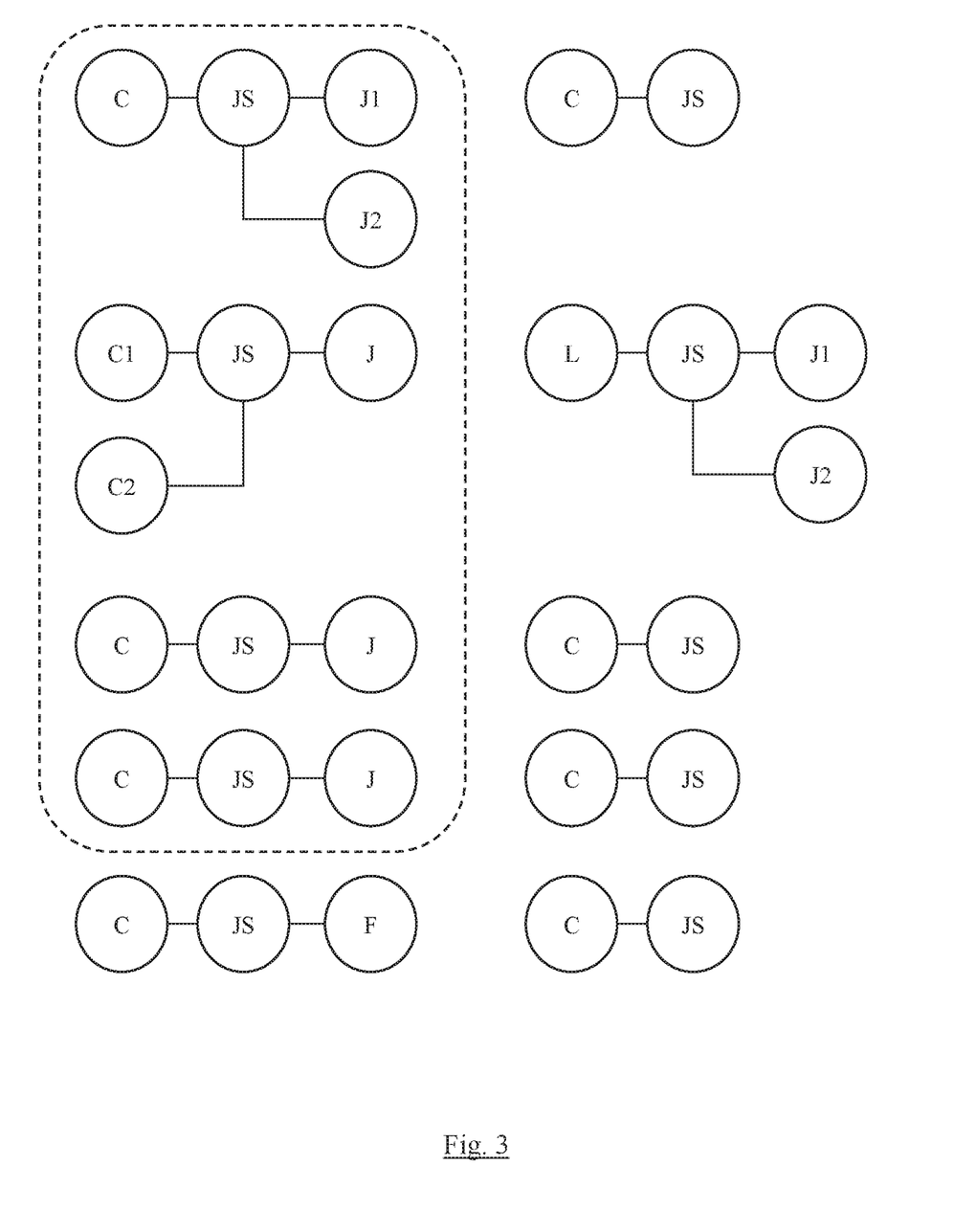
FIG. 3 is a schematic diagram of a set of graph patterns in accordance with an embodiment of the present invention.

The process is illustrated with respect to FIG. 3, which shows ten graph patterns 10 that make up the patterns 10 within a database 18. It will be appreciated that an actual database 18 of graph patterns 10 will have a huge number of such patterns 10 depending upon the nature of the data that is stored in the database 18, in many applications the number of patterns 10 stored in a database 18 will run into the millions. Here, ten patterns 10 are shown to illustrate the ranking process. The patterns show ten individuals called "John Smith" (JS) who live in either Cambridge (C) or London (L) and own a car that is either a Jaguar (J) or a Ford (F).

The user is searching for any person with name the John Smith that owns a Jaguar vehicle and lives in Cambridge. Out of all the ten graph patterns 10 shown, the first four match this query 20, these are the four contained within the dotted area. However, there are varying numbers of Person owns Jaguar and Person lives Cambridge triples 16 within all of these patterns 10. To rank each matching graph pattern (1 to 4), the matching process uses inverse frequency, which ranks network patterns based on triple frequency. Table 1 shows an example of an inverse graph-pattern frequency (IFG) that is calculated for each of the triples 16, where:

TABLE 1

IGF = total number of patterns/number of patterns containing the triple
IGF(Person owns Jaguar) = 10/5 = 2
IGF(Person lives Cambridge) = 10/9 = 1.11
For each matching graph pattern 10, there is then calculated an importance measure,
tfIGF score for each triple 16, where:
tf = number of triples within the matching pattern
tfIGF = tf * IGF

| Graph Pattern 1 | | |
|---|---|---|
| tfIGF (John Smith owns Jaguar) | =2 × 2 | =4 |
| tfIGF (John Smith lives Cambridge) | =1 × 1.11 | =1.11 |
| Total | | =5.11 (1st) |
| Graph Pattern 2 | | |
| tfIGF (John Smith owns Jaguar) | =1 × 2 | =2 |
| tfIGF (John Smith lives Cambridge) | =2 × 1.11 | =2.22 |
| Total | | =4.22 (2nd) |
| Graph Pattern 3 | | |
| tfIGF (John Smith owns Jaguar) | =1 × 2 | =2 |
| tfIGF (John Smith lives Cambridge) | =1 × 1.11 | =1.11 |
| Total | | =3.11 (3rd) |
| Graph Pattern 4 | | |
| tfIGF (John Smith owns Jaguar) | =1 × 2 | =2 |
| tfIGF (John Smith lives Cambridge) | =1 × 1.11 | =1.11 |
| Total | | =3.11 (3rd) |

The most relevant pattern is therefore graph pattern 1, next 2, then joint 3 and 4. Although both graph pattern 1 and graph pattern 2 have three matching triples, because John Smith owns Jaguar is less common than John Smith lives Cambridge, graph pattern 1 is seen to be more relevant than graph pattern 2.

Figure 4:
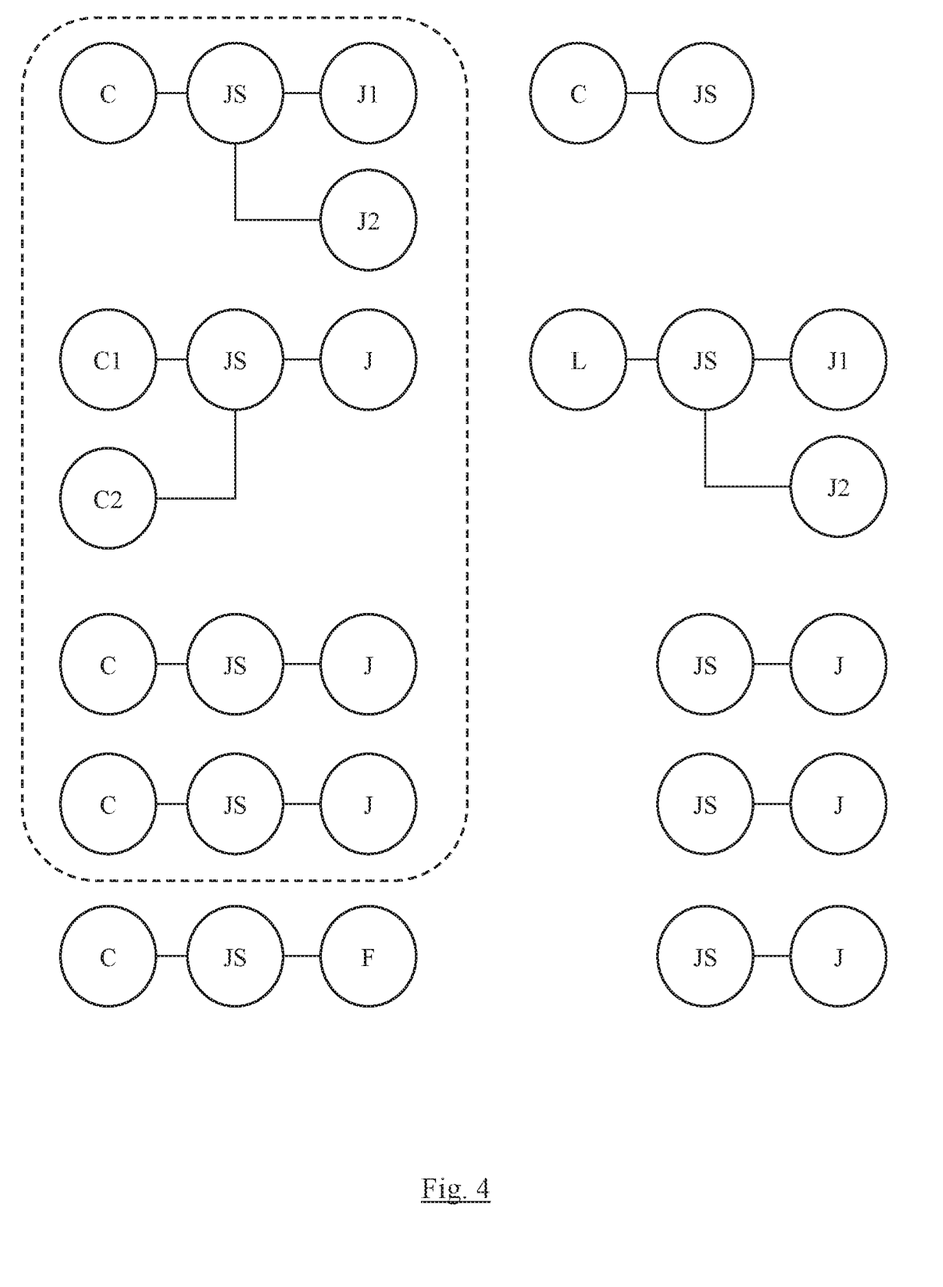
FIG. 4 is a schematic diagram of a second set of graph patterns in accordance with an embodiment of the present invention.

FIG. 4 shows a second set of graph patterns 10, which represent a different dataset from that shown in FIG. 3. The same query 20 is used with respect to the patterns 10 shown in FIG. 4 as was used with FIG. 3, which is that the user is searching for any person with name the John Smith that owns a Jaguar vehicle and lives in Cambridge. As before, out of all the ten graph patterns 10 shown, the first four match this query 20. However, the presence of different patterns 10 and triples 16 within the graph patterns 10 of the graph database 18 change the ranking process, as can be seen when the IGF values are calculated for the triples 16 from the query 20. Where John Smith owns Jaguar is more common than John Smith lives in Cambridge, the following scoring applies, as shown in Table 2:

TABLE 2

IGF(JohnSmith owns Jaguar) = 10/8 = 1.25
IGF(Person lives Cambridge) = 10/6 = 1.66

| Graph Pattern 1 | | |
|---|---|---|
| tfIGF (John Smith owns Jaguar) | =2 × 1.25 | =2.5 |
| tfIGF (John Smith lives Cambridge) | =1 × 1.66 | =1.66 |
| Total | | =4.16 (2nd) |
| Graph Pattern 2 | | |
| tfIGF (John Smith owns Jaguar) | =1 × 1.25 | =1.25 |
| tfIGF (John Smith lives Cambridge) | =2 × 1.66 | =3.32 |
| Total | | =4.57 (1st) |

TABLE 2-continued

Graph Pattern 3

| | | |
|---|---|---|
| tfIGF (John Smith owns Jaguar) | =1 × 1.25 | =1.25 |
| tfIGF (John Smith lives Cambridge) | =1 × 1.66 | =1.66 |
| Total | | =2.91 (3rd) |

Graph Pattern 4

| | | |
|---|---|---|
| tfIGF (John Smith owns Jaguar) | =1 × 1.25 | =1.25 |
| tfIGF (John Smith lives Cambridge) | =1 × 1.66 | =1.66 |
| Total | | =2.91 (3rd) |

In the example of Table 2, graph pattern 2 now has the highest score because "John Smith lives Cambridge" is less common than "John Smith owns Jaguar." The ranking process with respect to the graph patterns 10 shown in FIG. 4 provides a different result from that when working with the same query 20 with the graph patterns 10 of FIG. 3, since the inverse frequency is different for the triples 16 that are present in the user's query 20.

Figure 5:
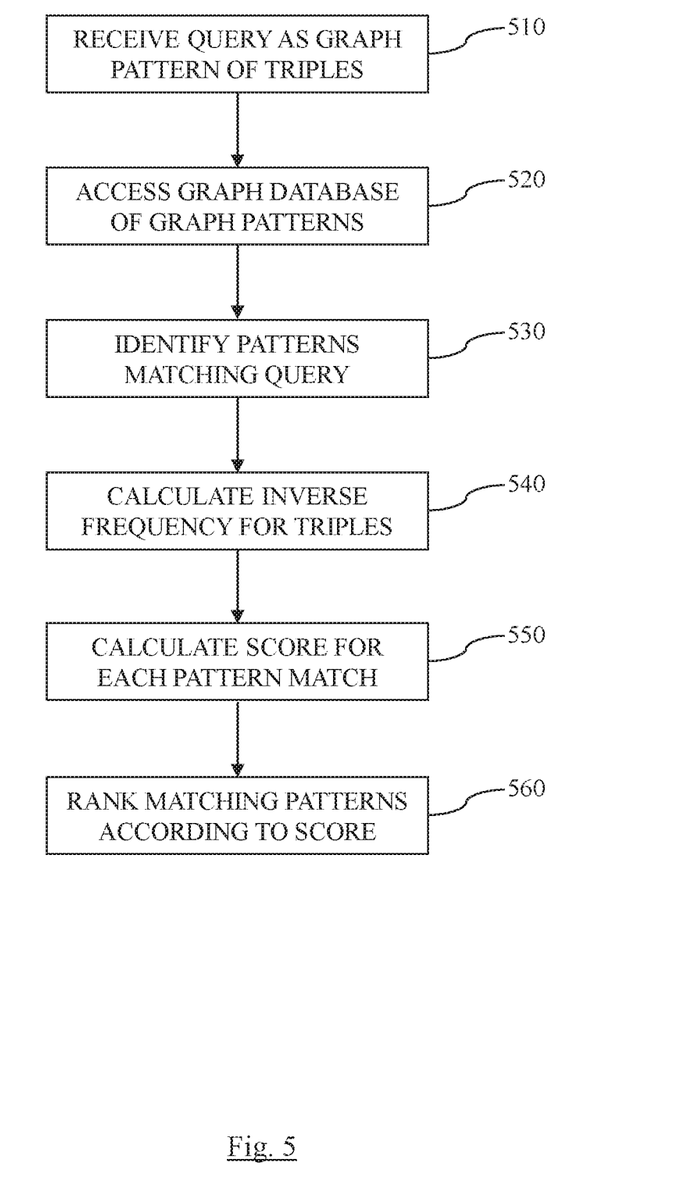
FIG. 5 is a flowchart of a method of ranking graph patterns in accordance with an embodiment of the present invention.

FIG. 5 shows a flowchart which summarises the ranking process. The first step of the method is step 510, which comprises receiving a query 20 comprising a graph pattern 10 comprising a plurality of graph triples 16 of node-edge-node. The second step of the method is step 520, which comprises accessing a graph database 18 comprising a plurality of graph patterns 10. The third step of the method is step 530, which comprises identifying a plurality of graph patterns 10 in the graph database 18 that match the received query 20. In this way a user's query 20 is matched to patterns 10 contained within the database 18 and these matching patterns 10 are then ranked in order.

The next step of the method is step 540, which comprises calculating an inverse frequency (IGF) for each graph triple 16 of the received query 20 in the accessed graph database 18. This is followed by the next step 550, which comprises calculating a score for each graph pattern 10 in the graph database 18 that matches the received query 20, the score comprising a sum of the inverse frequencies (IGF) for each graph triple 16 contained within the respective graph pattern 10, and the final step of the method is step 560, which comprises ranking the plurality of graph patterns 10 in the graph database 18 that match the received query 20 according to their respective calculated scores.

The process defined by FIG. 5 provides an efficient method of ranking graph patterns that have been returned from a search over a database 18 of graph patterns 10. All graph patterns 10 that match a query 20 are scored according to the rarity of the triples 16 contained within each matching graph patterns 10. Any graph pattern 10 that has multiple copies of a rare triple 16 contained within it will be scored more highly as a result of the ranking process. The inverse frequency will ensure that rare triples 16 (i.e., triples that are rare with respect to the graph database 18 as a whole) are scored more highly, which will raise the score of those matching patterns 10 that contain multiple copies of these triples 16.

The step 540 of calculating an inverse frequency for each graph triple 16 of the received query 20 in the accessed graph database 18 comprises dividing the number of graph patterns 10 in the graph database 18 by the number of times the respective triple 16 occurs in the graph database 18. The inverse frequency delivers an increased value for those triples 16 that are rarer within the patterns 10 within the database 18 as a whole. The inverse frequency places a higher value on those triples 16 that are less common and this results in higher scores for matching patterns 10 that contain more of the higher value triples 16.

Figure 6:
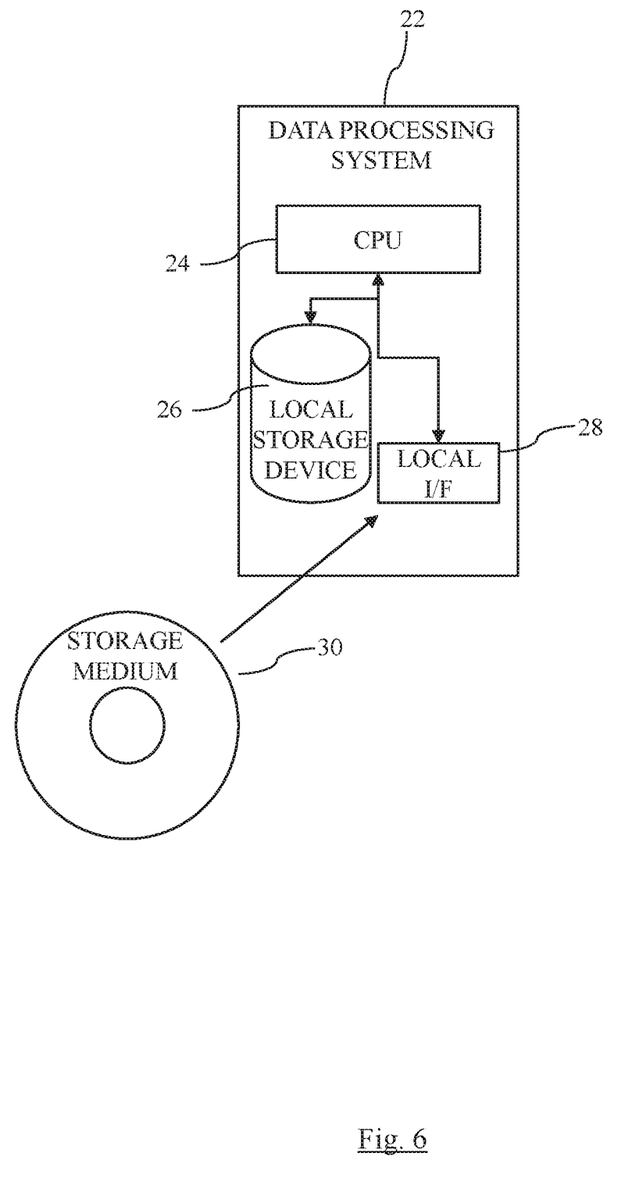
FIG. 6 is a schematic diagram of a data processing system in accordance with an embodiment of the present invention.

The ranking process shown in FIG. 5 is carried out by a data processing system which has direct access to the graph database 18. FIG. 6 shows one embodiment of a data processing system 22. The system 22 comprises a processor 24 that is controlling the operation of the data processing system 22. The processor 24 of the data processing system 22 is also connected to a local storage device 26 and to a local interface 28. A computer readable storage medium 30 is provided, which is a CD-ROM 30 storing a computer program product that can be used to control the processor 24 to operate the data processing system 22. The processor 24 executes instructions from the computer program product to operate the data processing system 22.

The processor 24 can also be operated to display a predetermined number of the highest ranked graph patterns 10 in the graph database 18 that match the received query 20 with their respective scores. The user receives their ranked results via a local graphical user interface shown on a connected display device. The ranking process may further comprise storing the calculated inverse frequency for each graph triple of the received query in the accessed graph database. The calculated inverse frequency values can be stored for future use, in order that in future reruns of the ranking process, if one or more of the same graph triples 16 occur in a future query 20, then the processor does not need to recalculate these values, thereby improving processing speed and performance and conserving resources.

If inverse frequency values are stored then the processor 24 is operated to determine that one or more graph patterns 10 have been added to or deleted from the graph database 18 and to delete the stored inverse frequencies. If there are future changes to the graph patterns 10 stored within the database 18, then the processor 24 must delete any stored inverse frequency values as the stored values will no longer be accurate for the changes that have been made to the database 18. Any future runs of the ranking process by the processor 24 must recalculate the inverse frequency values.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A computer-implemented method comprising:
   receiving a query comprising a graph pattern comprising a plurality of graph triples of node-edge-node;
   accessing a graph database comprising a plurality of graph patterns;
   identifying a plurality of graph patterns in the graph database that match the received query;
   calculating an inverse frequency for each graph triple of the identified graph patterns in the accessed graph database;
   calculating a score for each graph pattern in the graph database that matches the received query, the score comprising a sum of the inverse frequencies associated with graph triples contained within the respective graph pattern; and
   ranking the plurality of graph patterns in the graph database that match the received query according to their respective calculated scores.

2. The computer-implemented method of claim 1, wherein calculating an inverse frequency for each graph triple of the received query in the accessed graph database comprises dividing a number of graph patterns in the graph database by a number of times graph patterns containing the graph triple that occur in the graph database.

3. The computer-implemented method of claim 1, further comprising displaying a predetermined number of the highest ranked graph patterns in the graph database that match the received query with their respective scores.

4. The computer-implemented method of claim 1, further comprising storing the calculated inverse frequency for each graph triple of the received query in the accessed graph database.

5. The computer-implemented method of claim 4, further comprising determining that one or more graph patterns have been added to or deleted from the graph database and deleting the stored inverse frequencies.

6. A computer system comprising:
one or more computer processors;
one or more computer readable storage media;
program instructions stored on the one or more computer readable storage media for execution by at least one of the one or more computer processors, the program instructions comprising instructions to:
receive a query comprising a graph pattern comprising a plurality of graph triples of node-edge-node;
access a graph database comprising a plurality of graph patterns;
identify a plurality of graph patterns in the graph database that match the received query;
calculate an inverse frequency for each graph triple of the identified graph patterns in the accessed graph database;
calculate a score for each graph pattern in the graph database that matches the received query, the score comprising a sum of the inverse frequencies associated with graph triples contained within the respective graph pattern; and
rank the plurality of graph patterns in the graph database that match the received query according to their respective calculated scores.

7. The computer system of claim 6, wherein the instructions to calculate an inverse frequency for each graph triple of the received query in the accessed graph database, comprise instructions to divide a number of graph patterns in the graph database by a number of graph patterns containing the graph triple that occur in the graph database.

8. The computer system of claim 6, further comprising instructions to display a predetermined number of the highest ranked graph patterns in the graph database that match the received query with their respective scores.

9. The computer system of claim 6, further comprising instructions to store the calculated inverse frequency for each graph triple of the received query in the accessed graph database.

10. The computer system of claim 9, further comprising instructions to determine that one or more graph patterns have been added to or deleted from the graph database and delete the stored inverse frequencies.

11. A computer program product for controlling a data processing system comprising a processor, the computer program product comprising one or more computer readable storage media collectively having program instructions embodied therewith, the program instructions executable by the processor to cause the processor to:
receive a query comprising a graph pattern comprising a plurality of graph triples of node-edge-node;
access a graph database comprising a plurality of graph patterns,
identify a plurality of graph patterns in the graph database that match the received query;
calculate an inverse frequency for each graph triple of the identified graph patterns in the accessed graph database;
calculate a score for each graph pattern in the graph database that matches the received query, the score comprising a sum of the inverse frequencies associated with graph triples contained within the respective graph pattern; and
rank the plurality of graph patterns in the graph database that match the received query according to their respective calculated scores.

12. The computer program product of claim 11, wherein the instructions for calculating an inverse frequency for each graph triple of the received query in the accessed graph database comprise instructions for dividing a number of graph patterns in the graph database by a number of graph patterns containing the graph triple that occur in the graph database.

13. The computer program product of claim 11, further comprising instructions for displaying a predetermined number of the highest ranked graph patterns in the graph database that match the received query with their respective scores.

14. The computer program product of claim 11, further comprising instructions for storing the calculated inverse frequency for each graph triple of the received query in the accessed graph database.

15. The computer program product of claim 14, further comprising instructions for determining that one or more graph patterns have been added to or deleted from the graph database and deleting the stored inverse frequencies.

* * * * *